(12) United States Patent
Hassan Hussein et al.

(10) Patent No.: US 10,979,108 B2
(45) Date of Patent: Apr. 13, 2021

(54) INTERFERENCE FREE GEOGRAPHICAL ZONAL MAPPING UTILIZING SLOW VARYING CHANNEL COVARIANCE MATRIX

(71) Applicant: Fraunhofer-Gesellschaft zur Förderung der angewandten Forschung e.V., Munich (DE)

(72) Inventors: Khaled Shawky Hassan Hussein, Erlangen (DE); Martin Kurras, Berlin (DE); Lars Thiele, Berlin (DE); Thomas Haustein, Berlin (DE)

(73) Assignee: FRAUNHOFER-GESELLSCHAFT ZUR FÖRDERUNG DER ANGEWANDTEN FORSCHUNG E.V, Munich (DE)

( * ) Notice: Subject to any disclaimer, the term of this patent is extended or adjusted under 35 U.S.C. 154(b) by 0 days.

(21) Appl. No.: 16/716,927

(22) Filed: Dec. 17, 2019

(65) Prior Publication Data

US 2020/0127713 A1 Apr. 23, 2020

Related U.S. Application Data

(63) Continuation of application No. PCT/EP2017/070461, filed on Aug. 11, 2017.

(30) Foreign Application Priority Data

Jul. 13, 2017 (EP) .................................... 17181317

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0695* (2013.01); *H04L 5/0023* (2013.01); *H04L 5/0037* (2013.01)

(58) Field of Classification Search
CPC .... H04B 7/0456; H04B 7/0695; H04B 7/022; H04B 7/0617; H04L 5/0023; H04L 5/0035; H04L 5/0037
(Continued)

(56) References Cited

U.S. PATENT DOCUMENTS 6,232,918 B1 5/2001 Wax et al.
10,320,511 B2 6/2019 Fodor et al.
(Continued)

FOREIGN PATENT DOCUMENTS

WO 2016159851 A1 8/2016

OTHER PUBLICATIONS

V. Cadambe and S. Jafar, "Interference Alignment and Spatial Degrees of Freedom for the K User Interference Channel", Communications, 2008. ICC '08. IEEE International Conference on, pp. 971-975, May. 2008.
(Continued)

*Primary Examiner* — Emmanuel Bayard
(74) *Attorney, Agent, or Firm* — McClure, Qualey & Rodack, LLP

(57) ABSTRACT

Embodiments provide a transceiver, configured to select, responsive to a reported position of a mobile terminal, one channel covariance matrix out of a plurality of channel covariance matrices for communication with the mobile terminal or a further mobile terminal, wherein each of the channel covariance matrices is associated with a different one of a plurality of locations of a cell served by the transceiver.

29 Claims, 13 Drawing Sheets

(51) Int. Cl.
*H04B 7/06* (2006.01)
*H04L 5/00* (2006.01)

(58) Field of Classification Search
USPC .................................. 375/267, 299, 347–349
See application file for complete search history.

(56) References Cited

U.S. PATENT DOCUMENTS

| | | | | |
|---|---|---|---|---|
| 2011/0237282 | A1* | 9/2011 | Geirhofer | H04B 7/0626 455/509 |
| 2013/0034000 | A1* | 2/2013 | Huo | H04W 72/0466 370/252 |
| 2014/0029586 | A1* | 1/2014 | Loehr | H04B 3/36 370/336 |
| 2014/0044041 | A1 | 2/2014 | Moshfeghi et al. | |
| 2014/0376464 | A1* | 12/2014 | Nam | H04J 11/005 370/329 |
| 2015/0018001 | A1 | 1/2015 | Kim et al. | |
| 2015/0094057 | A1 | 4/2015 | Lu et al. | |
| 2015/0230257 | A1 | 8/2015 | Hagerman et al. | |
| 2016/0337877 | A1 | 11/2016 | Sorrentino et al. | |
| 2017/0086199 | A1* | 3/2017 | Zhang | H04W 64/00 |
| 2017/0163315 | A1* | 6/2017 | Wu | H04B 7/0617 |
| 2017/0207843 | A1* | 7/2017 | Jung | H04W 74/004 |
| 2017/0264355 | A1* | 9/2017 | Zhang | H04L 5/0048 |
| 2017/0374638 | A1* | 12/2017 | Han | G01S 5/10 |
| 2018/0219660 | A1* | 8/2018 | Cezanne | H04L 5/0048 |
| 2018/0368152 | A1* | 12/2018 | Lin | H04J 3/1694 |

OTHER PUBLICATIONS

D. Aziz, M. Mazhar and A. Weber, "Multi User Inter Cell Interference Alignment in Heterogeneous Cellular Networks", Vehicular Technology Conference (VTC Spring), 2014 IEEE 79th,pp. 1-5, May. 2014.

M. Kurras, M. Shehata, K. Hassan and L. Thiele, "Spatial interference management with hierarchical precoding in ultra-dense heterogeneous networks", Wireless and Mobile Computing, Networking and Communications (WiMob), 2015 IEEE Ith International Conference on, pp. 520-526, Oct. 2015.

M. Shehata, M. Kurras and K. Hassan, "Interference Alignment Precoding in Heterogeneous Networks with Intercell Interference", 2015—now: Mohamed Shehata, Martin Kurras, Khaled Hassan and Lars Thiele "Hierarchical Precoding in a Realistic Ultradense Heterogeneous Environment Exceeding the Degrees of Freedom" 2016. ETSI TS 136 201 V14.1.0 (Apr. 2017).

M. Kurras, L. Thiele and G. Caire, "Interference Mitigation and Multiuser Multiplexing with Beam-Steering Antennas", WSA 2015; 19th International ITG Workshop on Smart Antennas; Proceedings of, pp. 1-5, Mar. 2015.

M. Kurras, L. Thiele and G. Caire, "Multi-stage beamforming for interference coordination in massive MIMO networks",2015 49th Asilomar Conference on Signals, Systems and Computers, pp. 700-703, Nov. 2015.

J. Nam, A. Adhikary, J.-Y. Ahn and G. Caire, "Joint Spatial Division and Multiplexing: Opportunistic Beamforming, User Grouping and Simplified Downlink Scheduling", Selected Topics in Signal Processing,IEEE Journal of, vol. PP, pp. 1-1, 2014.

M. Kurras, S. Fahse and L. Thiele, "Density Based User Clustering for Wireless Massive Connectivity Enabling Internet of Things", 2015 IEEE Globecom Workshops (GC Wkshps), pp. 1-6, Dec. 2015.

Adhikary Ansuman et al : "Joint Spatial Division and Multiplexing—The Large-Scale Array Re", IEEE Transactions on In Formation Theory, I EEE Press, USA, vol. 59, No. 10, Oct. 1, 2013 (Oct. 1, 2013), pp. 6441-6463, XP011526827, ISSN: 0018-9448, DOI:10. 1109/TIT.2013.2269476 [retri eved on Sep. 11, 2013].

Liu An et al : "Hierarchical Interference Mitigation for Massive MIMO Cellular Networks" , IEEE Transactions on Signal Processing, IEEE Service Center, New York, NY, US, vol. 62, No. 18, Sep. 1, 2014 (Sep. 1, 2014), pp. 4786-4797, XP011556250, ISSN: 1053-587X,DOI: 10.1109/ TSP.2014.2340814 [retrieved on Aug. 15, 2014].

Danish Aziz et al : "Multi User Inter Cell Interference Alignment in Heterogeneous Cellular Networks", 2014 I EEE 79th Vehicular Technology Conference (VTC Spring), May 1, 2014 (May 1, 2014), pp. 1-5, XP055209954, DOI: 10.1109/VTCSpring.2014.7022994 ISBN: 978-1-47-994482-8.

* cited by examiner

INTERFERENCE FREE GEOGRAPHICAL ZONAL MAPPING UTILIZING SLOW VARYING CHANNEL COVARIANCE MATRIX

CROSS-REFERENCE TO RELATED APPLICATIONS

This application is a continuation of copending International Application No. PCT/EP2017/070461, filed Aug. 11, 2018, which is incorporated herein by reference in its entirety, and additionally claims priority from European Application No. 17181317.3, filed Jul. 13, 2017, which is also incorporated herein by reference in its entirety.

Embodiments relate to a transceiver of a wireless communication network and a method for operating the same. Further embodiments relate to a wireless communication network. Some embodiments relate to interference free geographical zonal mapping utilizing slow varying channel covariance matrix, or second-order statistics matrix, or dominant direction slowly varying channel matrix.

BACKGROUND OF THE INVENTION

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

Data may also be communicated over channels of a wired communication network or a combination of wired and wireless networks, for example, a local area network (LAN), a G.hn network operating over different types of wires like telephone wires, coaxial cables and/or power lines, or a wide area network (WAN) such as the internet.

In the above referenced networks data, for all current interference alignment/interference management, quasi perfect channel-state information (CSI) is needed at the base station (BS), evolved-node base station (eNB), or gigabit node base station (gNB). This makes the problem even more difficult if this channel-state information is needed for cancel the interference from the multiple neighboring cell (or multiple transmission reception points (TRP)) onto a small cell, group of users, or moving vehicles transmitting on their own via sidelinks transmission.

Hence, it is not practical the amount of training (reference signals), in both time division duplexing, and the amount of feedback overhead, in frequency division duplexing, between the macro coordinated base stations (gNB,eNB), the other macro or picot user equipment's (UEs) within its range, and the small cell/group of users of interest.

The considerations of future (cellular) wireless communications systems are directing us to increase spectral efficiency per area assuming the following. First, densifying the cellular network with small/pico cells leads to a heterogeneous network. Second, all cells may operate on all frequency bands which leads to frequency reuse one. Third, frequency reuse one needs a highest spectral efficiency per area (if intra and inter-cell interference (ICI) are close too (or below) the background noise level) Hence, interference coordination/alignment is needed to cancel/reduce significantly the interference level.

Interference alignment is known from MIMO (multiple input multiple output) and massive MIMO systems [V. Cadambe and S. Jafar, "Interference Alignment and Spatial Degrees of Freedom for the K User Interference Channel", Communications, 2008. ICC '08. IEEE International Conference on, pp. 971-975, May 2008], [D. Aziz, M. Mazhar and A. Weber, "Multi User Inter Cell Interference Alignment in Heterogeneous Cellular Networks", Vehicular Technology Conference (VTC Spring), 2014 IEEE 79th, pp. 1-5, May 2014], [M. Kurras, M. Shehata, K. Hassan and L. Thiele, "Spatial interference management with hierarchical precoding in ultra-dense heterogeneous networks", Wireless and Mobile Computing, Networking and Communications (WiMob), 2015 IEEE 11th International Conference on, pp. 520-526, October 2015] and [M. Shehata, M. Kurras and K. Hassan, "Interference Alignment Precoding in Heterogeneous Networks with Inter-cell Interference", 2015].

Further, interference alignment based only on first order statistics is known from [M. Kurras, M. Shehata, K. Hassan and L. Thiele, "Spatial interference management with hierarchical precoding in ultra-dense heterogeneous networks", Wireless and Mobile Computing, Networking and Communications (WiMob), 2015 IEEE 11th International Conference on, pp. 520-526, October 2015]

Multistage precoding and precoding based on instantaneous channel information and/or covariance slow channel information is known from [A. Adhikary, J. Nam, J.-Y. Ahn and G. Caire, "Joint Spatial Division and Multiplexing: The Large-Scale Array Regime", Information Theory, IEEE Transactions on, vol. 59, pp. 6441-6463, 2013], [M. Kurras, L. Thiele and G. Caire, "Interference Mitigation and Multiuser Multiplexing with Beam-Steering Antennas", WSA 2015; 19th International ITG Workshop on Smart Antennas; Proceedings of, pp. 1-5, March. 2015] and [M. Kurras, L. Thiele and G. Caire, "Multi-stage beamforming for interference coordination in massive MIMO networks", 2015 49th Asilomar Conference on Signals, Systems and Computers, pp. 700-703, November 2015].

User grouping based on channel covariance information is known from [J. Nam, A. Adhikary, J.-Y. Ahn and G. Caire, "Joint Spatial Division and Multiplexing: Opportunistic Beamforming, User Grouping and Simplified Downlink Scheduling", Selected Topics in Signal Processing, IEEE Journal of, vol. PP, pp. 1-1, 2014] and [M. Kurras, S. Fahse and L. Thiele, "Density Based User Clustering for Wireless Massive Connectivity Enabling Internet of Things", 2015 IEEE Globecom Workshops (GC Wkshps), pp. 1-6, December 2015]

SUMMARY

An embodiment may have a transceiver, wherein the transceiver is configured to select, responsive to a reported position of a mobile terminal, one communication matrix out of a plurality of communication matrices for communication with the mobile terminal; wherein each of the communication matrices is associated with a different one of a plurality of locations of a cell served by the transceiver; wherein the plurality of communication matrices are channel covariance matrices or second-order statistics matrices or dominant direction slowly varying channel matrices; wherein the transceiver is configured to select, responsive to a reported position of a further mobile terminal located in a different location of the cell than the mobile terminal, one further communication matrix out of the plurality of communication matrices; wherein the transceiver is configured to select an antenna beam for communicating with the mobile terminal using the selected communication matrix and the selected further communication matrix.

According to another embodiment, a wireless communication network may have: an inventive transceiver; and a mobile terminal.

According to another embodiment, a method for operating a transceiver may have the steps of: selecting, responsive to a reported position of a mobile terminal, one communication matrix out of a plurality of communication matrices for communication with the mobile terminal; wherein each of the communication matrices is associated with a different one of a plurality of locations of a cell served by the transceiver; wherein the plurality of communication matrices are channel covariance matrices or second-order statistics matrices or dominant direction slowly varying channel matrices; selecting, responsive to a reported position of a further mobile terminal located in a different location of the cell than the mobile terminal, one further communication matrix out of the plurality of communication matrices; and selecting an antenna beam for communicating with the mobile terminal using the selected communication matrix and the selected further communication matrix.

According to another embodiment, a method for generating a database having stored a plurality of communication matrices associated with a plurality of different locations of a cell of a wireless communication network, wherein the plurality of communication matrices are channel covariance matrices or second-order statistics matrices or dominant direction slowly varying channel matrices, may have the steps of: clustering measured communication matrices based on reported positions at which the communication matrices were measured, to obtain a plurality of clusters of measured communication matrices; determining an average communication matrix for each of the plurality of clusters of measured communication matrices; and associating each average communication matrix with a location of the cell of the wireless communication network is divided into based on the reported positions at which the communication matrices of the respective cluster were measured, to obtain a plurality of communication matrices associated with a plurality of different locations.

Embodiments provide a transceiver, configured to select, responsive to a reported position of a mobile terminal, one channel covariance matrix out of a plurality of channel covariance matrices for communication with the mobile terminal or a further mobile terminal, wherein each of the channel covariance matrices is associated with a different one of a plurality of locations of a cell served by the transceiver.

Further embodiments provide a wireless communication network comprising a transceiver and a mobile terminal. The transceiver is configured to select, responsive to a reported position of a mobile terminal, one channel covariance matrix out of a plurality of channel covariance matrices for communication with the mobile terminal or a further mobile terminal, wherein each of the channel covariance matrices is associated with a different one of a plurality of locations of a cell served by the transceiver.

Further embodiments provide a mobile terminal operating in a cell of a wireless communication network, wherein the mobile terminal is configured to use downlink resources of the wireless communication network for communicating with another mobile terminal, if a transceiver of the wireless communication network serving the cell signals that the location at which the mobile terminal is located is free from interference from communications from the transceiver.

Further embodiments provide a method for operating a transceiver, the method comprising a step of selecting, responsive to a reported position of a mobile terminal, one channel covariance matrix out of a plurality of channel covariance matrices for communication with the mobile terminal or a further mobile terminal, wherein each of the channel covariance matrices is associated with a different one of a plurality of locations of a cell served by the transceiver.

Further embodiments provide a method for generating a database having stored a plurality of channel covariance matrices associated with a plurality of different locations of a cell of a wireless communication network. The method comprises a step of clustering measured channel covariance matrices based on reported positions at which the channel covariance matrices were measured, to obtain a plurality of clusters of measured channel covariance matrices. Further, the method comprises a step of determining an average channel covariance matrix for each of the plurality of clusters of measured channel covariance matrices. Further, the method comprises a step of associating each average channel covariance matrix with a location of the cell of the wireless communication network is divided into based on the reported positions at which the channel covariance matrices of the respective cluster were measured, to obtain a plurality of channel covariance matrices associated with a plurality of different locations.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
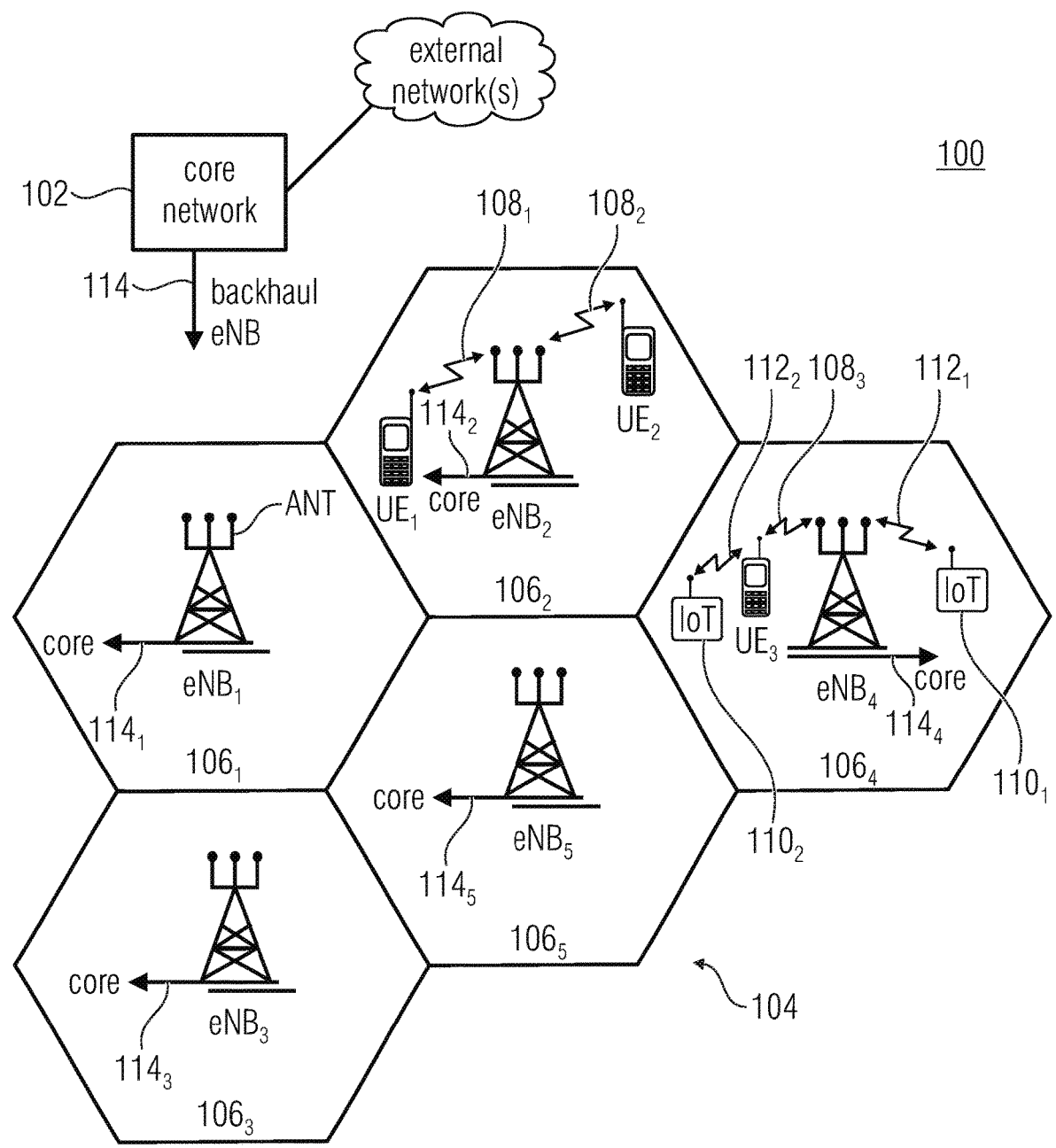
FIG. 1 shows a schematic representation of an example of a wireless communication system.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
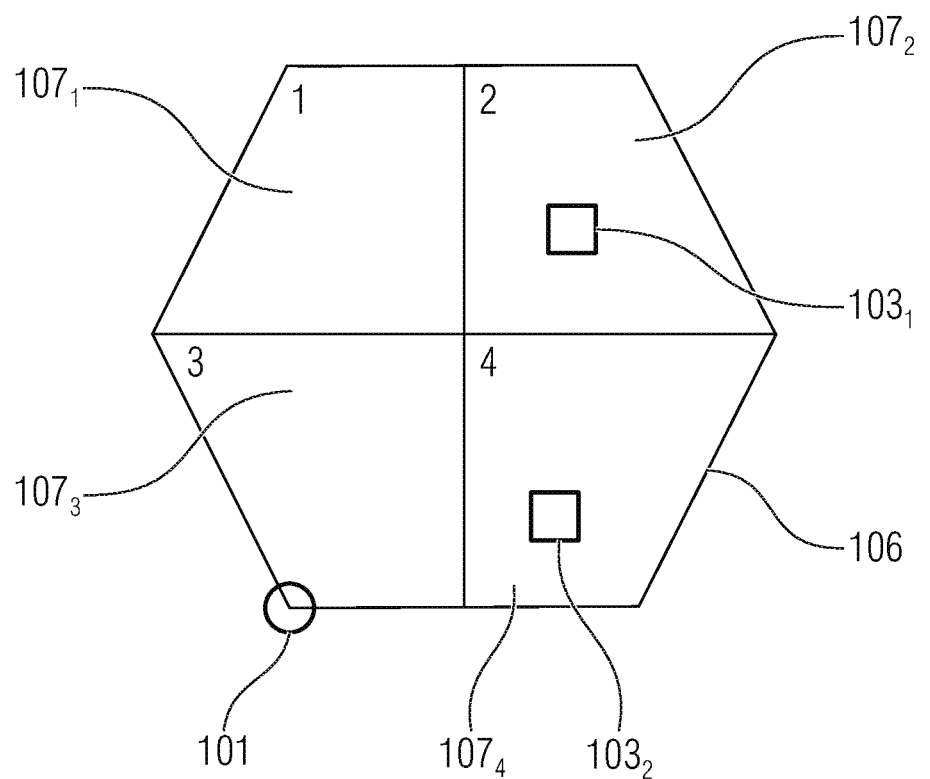
FIG. 2 shows a schematic block diagram of a wireless communication network comprising a transceiver and a mobile terminal, according to an embodiment.

FIG. 2 shows a schematic block diagram of a wireless communication network 100 comprising a transceiver 101 and a mobile terminal 103, according to an embodiment.

The transceiver 101 is configured to select, responsive to a reported position of a mobile terminal $103_1$, one channel covariance matrix out of a plurality of channel covariance matrices for communication with the mobile terminal $103_1$ or a further mobile terminal $103_2$, wherein each of the channel covariance matrices is associated with a different one of a plurality of locations $107_1$ to $107_4$ of a cell 106 served by the transceiver 101.

For example, in the embodiment shown in FIG. 2, the cell 106 which is served by the transceiver 101 is divided into four locations $107_1$ to $107_4$. Each of the locations $107_1$ to $107_4$ is associated with a channel covariance matrix, i.e. a first channel covariance matrix is associated with the first location $107_1$, a second channel covariance matrix is associated with the second location $107_2$, a third channel covariance matrix is associated with the third location $107_3$, and a fourth channel covariance matrix is associated with the fourth location $107_4$.

In embodiments, the transceiver 101 can be configured to select, in response to the reported position of the mobile terminal $103_1$, which is exemplarily located (or positioned) in FIG. 2 within the second location $107_2$, the second channel covariance matrix (out of the first to fourth channel covariance matrices) for communicating with the mobile terminal $103_1$.

For example, the transceiver 101 can be configured to communicate with the mobile terminal $103_1$ using the selected second channel covariance matrix, e.g., by selecting (or forming) an antenna beam for communicating with the mobile terminal $103_1$ using the selected second channel covariance matrix.

Further, the transceiver 101 can be configured to select responsive to a reported position of a further mobile terminal $103_2$ located in a different location of the cell 106 than the mobile terminal $103_1$, one further channel covariance matrix out of the plurality of channel covariance matrices, and to select an antenna beam for communicating with the mobile terminal $103_1$ using the selected channel covariance matrix and the selected further channel covariance matrix.

For example, the transceiver 101 can be configured to select responsive to a reported position of the further mobile terminal $103_2$, which is exemplarily located (or positioned) in FIG. 2 within the fourth location $107_4$, the fourth channel covariance matrix (out of the first to fourth channel covariance matrices) for adapting the communication with the mobile terminal $103_1$, e.g., by selecting an antenna beam for communicating with the mobile terminal $103_1$ using both, the selected second channel covariance matrix and the fourth channel covariance matrix. Thus, the transceiver 101 can be configured to adapt the antenna beam which is used for communicating with mobile terminal $103_1$ by using the fourth channel covariance matrix which corresponds to the fourth location $107_4$, in which the further mobile terminal $103_2$ is exemplarily located according to FIG. 2. By adapting the antenna beam which is used for communicating with mobile terminal $103_1$ an interference caused by this communication on the fourth location $107_4$ and thus on the further mobile terminal $103_2$ can be reduced or even eliminated.

In embodiments transceiver 101 could also (or alternatively) be adapted to select, in response to the reported position of the mobile terminal $103_1$, which is exemplarily located (or positioned) in FIG. 2 within the second location $107_2$, the second channel covariance matrix (out of the first to fourth channel covariance matrices) for communicating with the further mobile terminal $103_2$, which is located in the fourth location $107_4$. Thus, in this case, the transceiver 101 may adapt the communication with further mobile terminal $103_2$, using the selected second channel covariance matrix which corresponds to the second location $107_2$ in which the mobile terminal $103_1$, which, for example, just logged in into the cell 106 served by the transceiver 101, is located.

For example, the transceiver 101 can be configured to adapt the antenna beam which is used for communicating with further mobile terminal $103_2$ by using the selected second channel covariance matrix which corresponds to the second location $107_2$, in which the mobile terminal $103_1$ is located. By adapting the antenna beam which is used for communicating with further mobile terminal $103_2$ an interference caused by this communication on the second location $107_2$ and thus on the mobile terminal $103_1$ can be reduced or even eliminated.

In embodiments, the transceiver 101 can be, for example, a base station, evolved-node base station or gigabit node base station.

In embodiments, the mobile terminal can be a user equipment, which can be a vehicle transceiver device, a moving handheld, an IoT device, a moving relay, or fixed device.

In embodiments, a position oriented/zonal map with all covariance matrices of possibly located wireless users in indoor locations and/or outdoor positions covered with small cells like femto, pico, and micro cells, or a group of users sharing the same covariance matrix can be generated.

Figure 3:
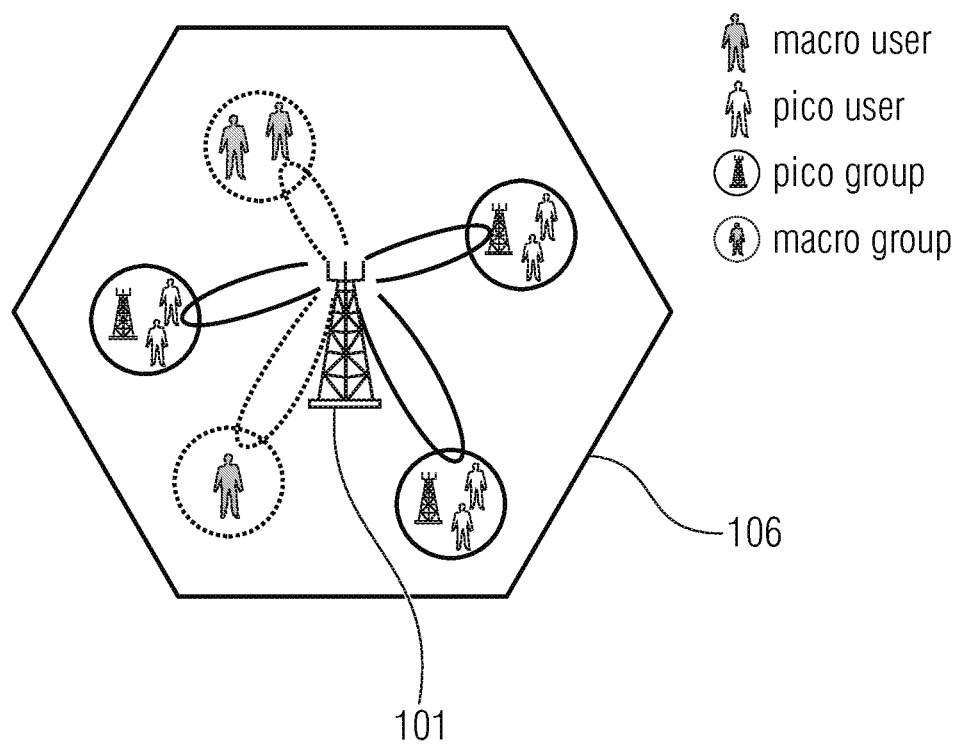
FIG. 3 shows a schematic block diagram a wireless communication network comprising a base station serving a cell with macro groups and pico groups.

FIG. 3 shows a schematic block diagram a wireless communication network comprising a base station 101 serving a cell with macro groups $111_1$ and $111_2$ and pico groups $113_1$ to $113_3$. The macro groups $111_1$ and $111_2$ may have macro users and the pico groups $113_1$ to $113_3$ may have pico users. In FIG. 3, the first stage pre-beamforming based on the location based covariance matrix for pico-users (indoor or can be also outdoor) is shown.

A base station (BS) or each base station (e.g., of the wireless communication network) can design a precoder based on the position oriented map with the covariance matrices. Hence, to protect a certain area from interference by its own transmission, e.g. if a macro base station transmits to users attached to a pico-base station but within the coverage area of the macro base station, by using the position based/zonal map of covariance matrices. Therefore, once the map is created (and updated in certain intervals) this interference free zone can be created based on a position.

Figure 4:
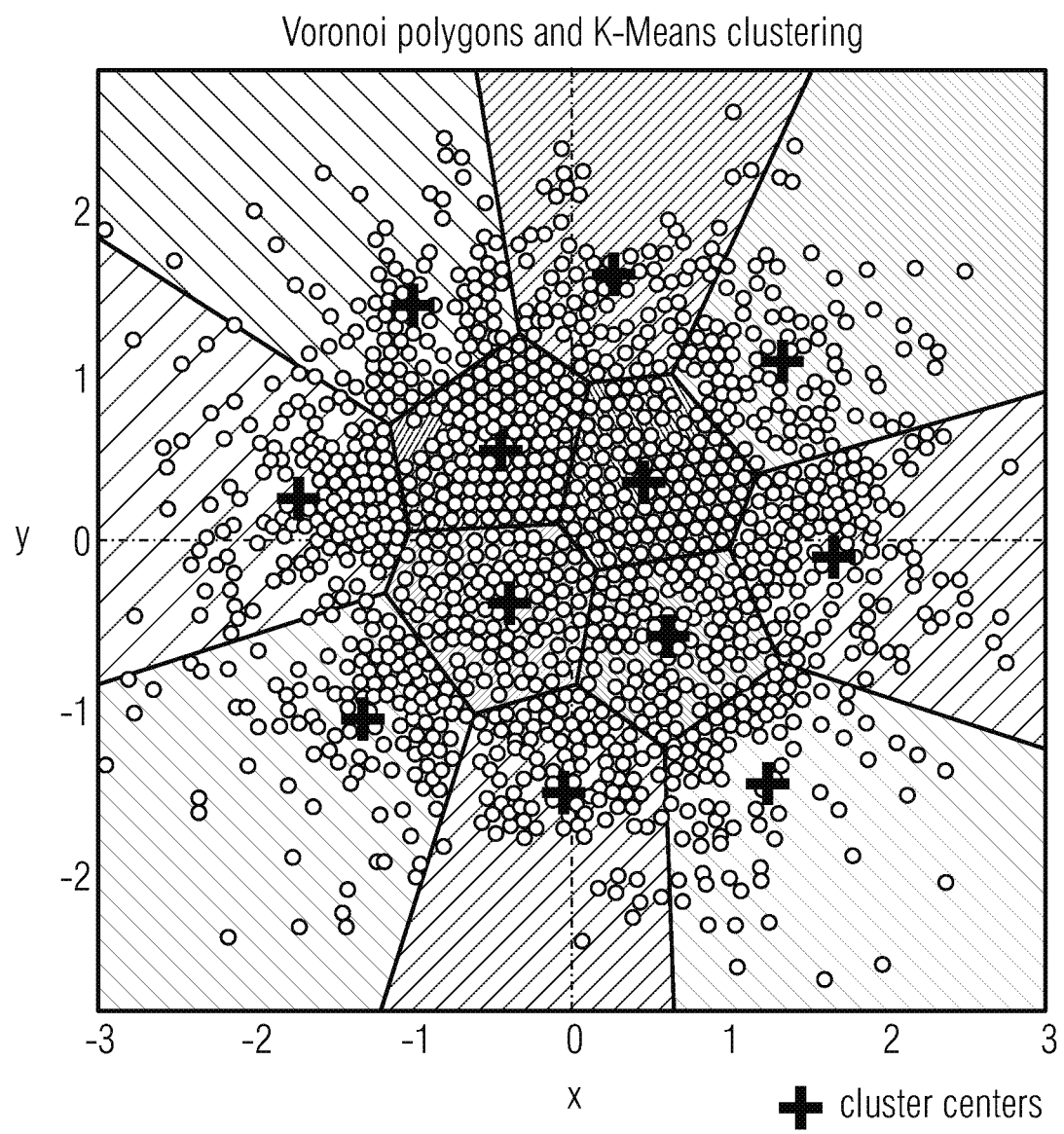
FIG. 4 shows a schematic block diagram of users clustered based on covariance measurements (Voronoi polygons and K-Means clustering)

FIG. 4 shows a schematic block diagram of users clustered based on covariance measurements (Voronoi polygons and K-Means clustering).

To generate the zonal map, the base station (or evolved-node base station, or gigabit node base station) may requests, for example, on a long-term basis, the channel covariance matrix (e.g., long-term $2^{nd}$ order channel-state information (CSI)) can be calculated for the users passing by/residing on each location on the map. All the covariance matrices may be stored, for example, in the cloud or central coordinator.

Clustering can be made for the recorded covariance matrices, where each cluster may confine, for example, all similar covariance matrices with a possible single representative base station-side covariance for spatial each cluster.

Figure 5:
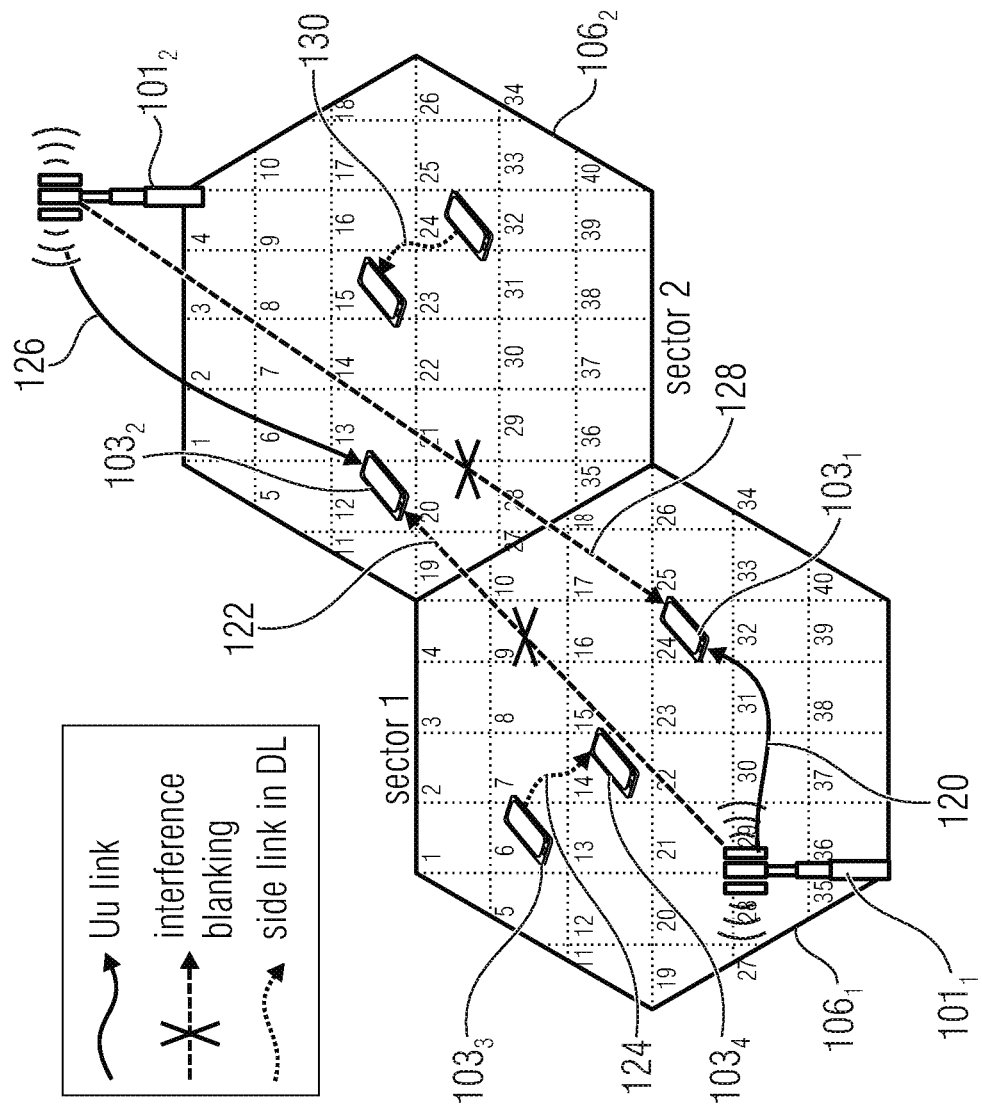
FIG. 5 shows a schematic block diagram of a wireless communication network comprising a first base station serving a first sector and a second base station serving a second sector.

FIG. 5 shows a schematic block diagram of a wireless communication network comprising a first base station $101_1$ serving a first sector $106_1$ and a second base station $101_2$ serving a second sector $106_2$. In other words, FIG. 5 shows zonal mapping based on the transmit covariance matrices; each zone (represented visually as numbered square in each cell) has a representative basestation-side covariance.

The saved covariance matrices (saved in the offline zonal map) can be used for single or MU-MIMO precoding towards intended receivers with high-SINR (signal-to-interference-plus-noise ratio) reachability; this can satisfy reliability requirements for, e.g., ultra-reliable mobile terminals (e.g., UEs). The channel covariance matrices map can be also used to cancel the interference generated while transmitting to some intended intra-cell users and/or intercell interference generated by the surrounding base station (or evolved-node base station, or gigabit-node base station). This generates interference free zones/spots in the map of interest which can be utilized for safely reusing downlink resources (among cells or within the cell of interest).

For example, referring to FIG. 5, the first sector $106_1$ which is served by the first transceiver $101_1$ can be divided into 40 locations, each of which can be associated with one channel covariance matrix. Further, also the second sector $106_2$ which is served by the second transceiver $101_2$ can be divided into 40 locations, each of which can be associated with one channel covariance matrix.

The first transceiver $101_1$ can be configured to communicate (Uu link) 120 with the first mobile terminal $103_1$ using a channel covariance matrix associated with the location in which the first mobile terminal $103_1$ is located, e.g., channel covariance matrix 24 which is associated with location 24 of the first sector $106_1$. Further, the first transceiver $101_1$ can be configured to adapt its communication 120 with the first mobile terminal $103_1$, e.g., adapt the antenna beam used for communicating with the first mobile terminal $103_1$, using the channel covariance matrices associated with the locations in which other mobile terminals, which previously reported their positions, are located.

For example, the first transceiver $101_1$ can be configured to adjust its communication 120 with the first mobile terminal $103_1$ using the channel covariance matrix associated with location 12 of the second sector $106_2$ in which a second mobile terminal $103_2$ is located, such that an interference caused by the ongoing communication 120 on location 12 of the second sector $106_2$ and thus on the second mobile terminal $103_2$ can be reduced or even eliminated (indicated with interference blanking 122 in FIG. 5). Similarly, the first transceiver $101_1$ can be configured to adjust its communication 120 with the first mobile terminal $103_1$ using the channel covariance matrices associated with locations 6 and 14 in which third and fourth mobile terminals $103_3$ and $103_4$ are located, such that an interference caused by the ongoing communication 120 on locations 6 and 14 and thus on third and fourth mobile terminals $103_3$ and $103_4$ can be reduced or even eliminated. In this case, third and fourth mobile terminals $103_3$ and $103_4$ are located in "interference free locations" (interference free from communications performed by the first transceiver $101_1$) and can thus perform a side link communication 122 using downlink resources, i.e. resources normally reserved for the first transceiver $101_1$. Additionally, the first transceiver $101_1$ can be configured to adjust its communication 120 with the first mobile terminal $103_1$ using the channel covariance matrices associated with locations 15 and 14 of the second sector $106_2$ in which fifth and sixth mobile terminals $103_5$ and $103_6$ are located, such that an interference caused by the ongoing communication 120 on locations 15 and 24 of the second sector $106_2$ and thus on fifth and sixth mobile terminals $103_5$ and $103_6$ can be reduced or even eliminated.

The second transceiver $101_2$ can be configured to communicate (Uu link) 126 with the second mobile terminal $103_2$ using a channel covariance matrix associated with the location in which the second mobile terminal $103_2$ is located, e.g., channel covariance matrix 12 which is associated with location 12 of the second sector $106_2$. Further, the second transceiver $101_2$ can be configured to adapt its communication 126 with the second mobile terminal $103_2$, e.g., adapt the antenna beam used for communicating with the second mobile terminal $103_2$, using the channel covariance matrices associated with the locations in which other mobile terminals, which previously reported their positions, are located.

For example, the second transceiver $101_2$ can be configured to adjust its communication 126 with the second mobile terminal $103_2$ using the channel covariance matrix associated with location 24 of the first sector $106_1$ in which the first mobile terminal $103_1$ is located, such that an interference caused by the ongoing communication 126 on location 24 of the first sector $106_1$ and thus on the first mobile terminal $103_1$ can be reduced or even eliminated (indicated with interference blanking 128 in FIG. 5). Similarly, the second transceiver $101_2$ can be configured to adjust its communication 126 with the second mobile terminal $103_2$ using the channel covariance matrices associated with locations 15 and 14 of the second sector $106_2$ in which fifth and sixth mobile terminals $103_5$ and $103_6$ are located, such that an interference caused by the ongoing communication 126 on locations 15 and 24 of the second sector $106_2$ and thus on fifth and sixth mobile terminals $103_5$ and $103_6$ can be reduced or even eliminated. In this case, fifth and sixth mobile terminals $103_5$ and $103_6$ are located in "interference free locations" (interference free from communications performed by the second transceiver $101_2$) and can thus perform a side link communication 130 using downlink resources, i.e. resources normally reserved for the second transceiver $101_2$. Additionally, the second transceiver $101_2$ can be configured to adjust its communication 126 with the second mobile terminal $103_2$ using the channel covariance matrices associated with locations 6 and 14 of the first sector $106_1$ in which third and fourth mobile terminals $103_3$ and $103_4$ are located, such that an interference caused by the ongoing communication 126 on locations 6 and 14 of the first sector $106_1$ and thus on third and fourth mobile terminals $103_3$ and $103_4$ can be reduced or even eliminated.

Figure 6:
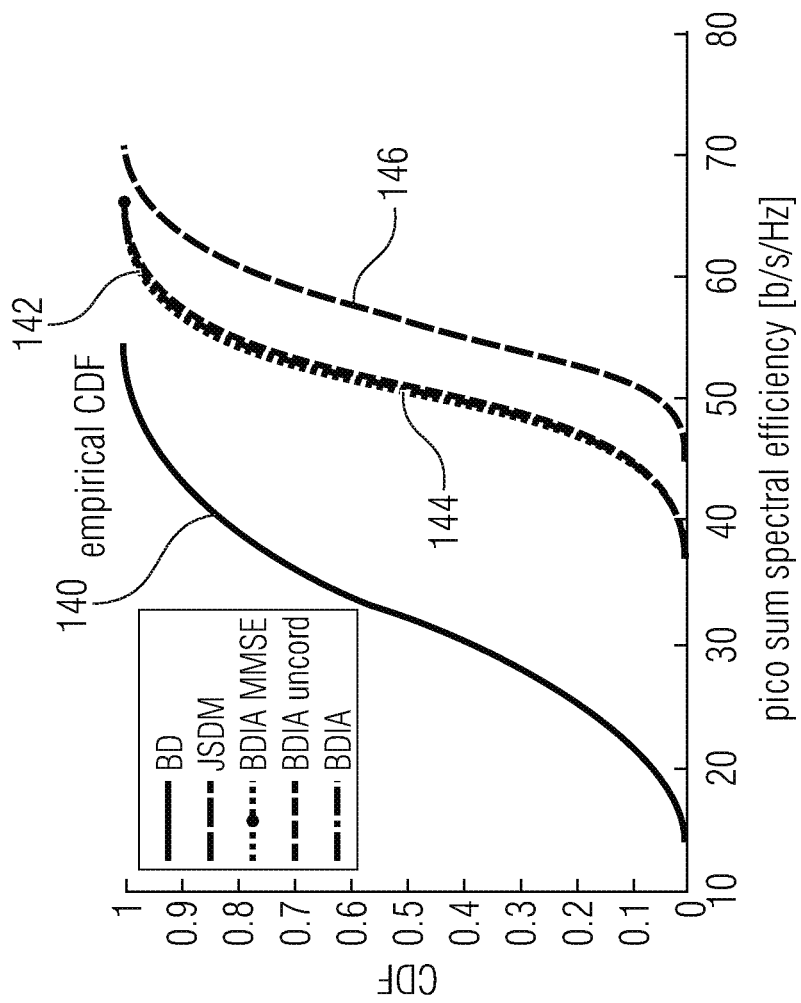
FIG. 6 shows in a diagram an empirical CDF plotted over pico sum spectral efficiency for different beamforming techniques.

FIG. 6 shows in a diagram an empirical CDF (CDF=cumulative distribution function) plotted over pico sum spectral efficiency for different beamforming techniques. Thereby, a first curve 140 shows the results for BD (BD=block diagonalization), a second curve 142 shows the results for BDIA (BDIA=block diagonalization interference alignment), a third curve 144 shows the results for BDIA MMSE (MMSE=minimum mean square error), and a fourth curve 146 shows the results for JSDM (JSDM=joint spatial division multiplexing).

As shown in FIG. 6, the JSDM technique outperforms the block diagonalization beamforming (even with MMSE and with Coordinated Multi-Points). These results were generated as the scenario as in FIG. 3 with two UE in the macro cell, two pico cells, and two UEs in the pico cell. Interference is aligned using one of the previous options.

In the following, detailed embodiments are described.

Channel Covariance Matrices Zonal/Location-Based Map

Figure 7:
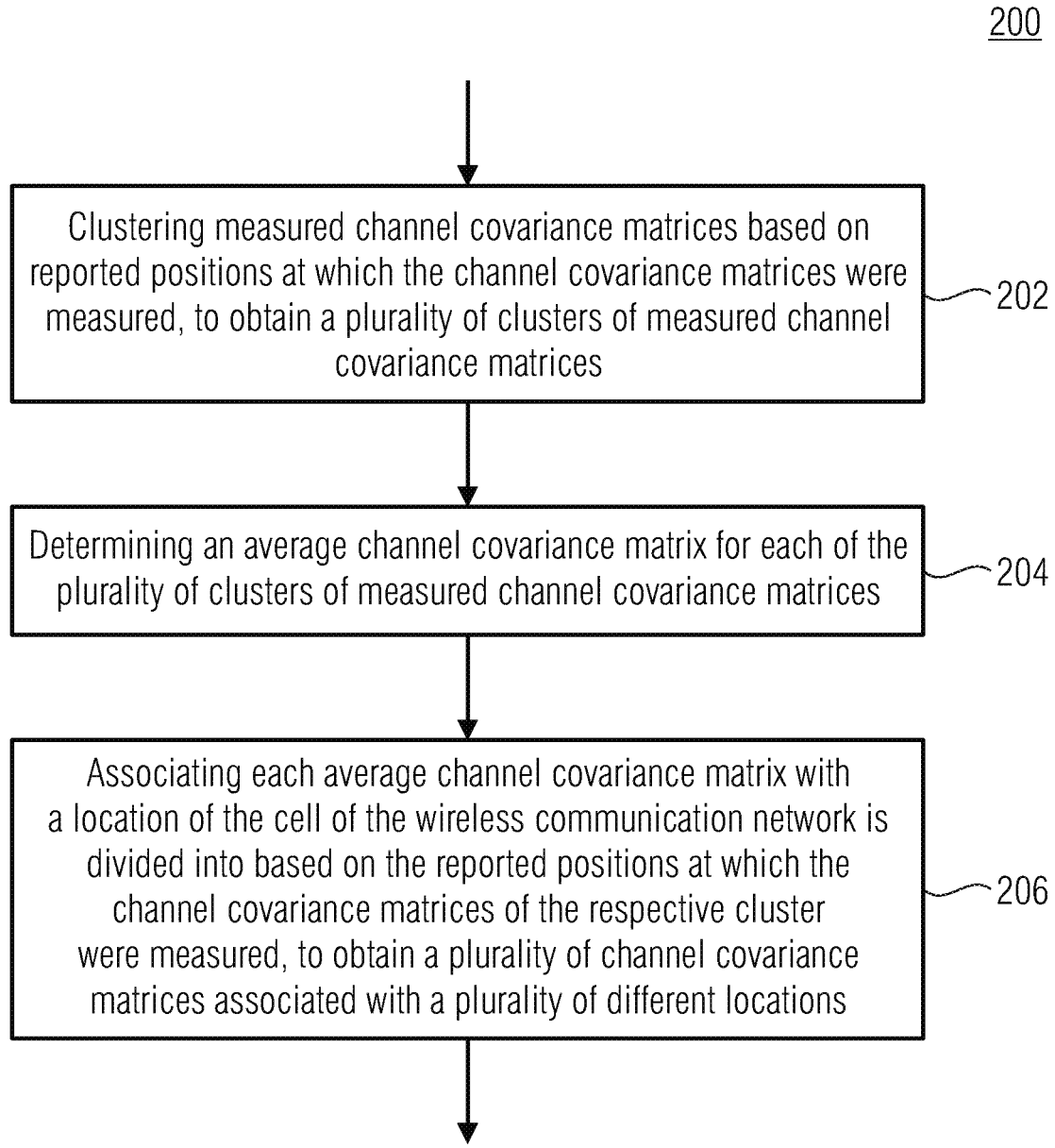
FIG. 7 shows a flowchart of a method for generating a database having stored a plurality of channel covariance matrices associated with a plurality of different locations of a cell of a wireless communication network, according to an embodiment.

FIG. 7 shows a flowchart of a method 200 for generating a database having stored a plurality of channel covariance matrices associated with a plurality of different locations of a cell of a wireless communication network.

In embodiment, the method can comprise a step 202 of clustering measured channel covariance matrices based on reported positions at which the channel covariance matrices were measured, to obtain a plurality of clusters of measured channel covariance matrices.

For example, a quasi-static and/or time-stamped user clustering can be build. Thereby, the physical nature of the pico/small cells that are generally located indoor or small zones outdoor or user groups of the macro cell, which are having merely the same BS-side covariance matrices, can be utilized. Users will feedback these matrices to the base station, gigabit-node base station or evolved-node base station, which will capture them on a long time base. The base station, gigabit-node base station or evolved-node base station can cluster those users together with any clustering technique, e.g., K-mean or density based approaches [M. Kurras, S. Fahse and L. Thiele, "Density Based User Clustering for Wireless Massive Connectivity Enabling Internet of Things", 2015 IEEE Globecom Workshops (GC Wkshps), pp. 1-6, December 2015]; see FIG. 4 for more details about possible clustering Voronoi polygons for K-mean clustering. The selected covariance matrix can be used saved for multistage beamforming based on a slowly/semi-static updated covariance map. For accuracy, these matrices can be updated slowly over time and captured for different traffic load balance around the day, i.e., with time stamped updates.

In embodiments, the method 200 can comprise a step 204 of determining an average channel covariance matrix for each of the plurality of clusters of measured channel covariance matrices, and a step 206 of associating each average channel covariance matrix with a location of the cell of the wireless communication network is divided into based on the reported positions at which the channel covariance matrices of the respective cluster were measured, to obtain a plurality of channel covariance matrices associated with a plurality of different locations.

For example, a channel covariance matrices zonal/location-based map can be provided. For each single cluster, users located nearby to each other (within this cluster) will be experiencing almost/exactly similar covariance matrix. This covariance matrix (second order statistics), in each location/cluster position, can be updated slowly and captured by the base station, gigabit-node base station or evolved-node base station as continuous measurements reports or during the beam-management. The saved covariance matrix is semi static and saved in offline look-up tables resemble the covariance matrices of the zonal/geographical map for clusters spots.

Further, the representative base station-side covariance can be selected for each cluster in the map; here, for each zone, the base station, gigabit-node base station or evolved-node base station would converge to a single base station-side covariance matrix for every zone and store it in a quasi-static (slowly updated/also marked different time stamps and daily varying traffic) zonal map of the representative base station-side covariance of each cluster In embodiments, a position update can be performed. Once the zonal channel (base station-side) covariance representative matrices map exists at the base station, gigabit-node base station or evolved-node base station, the users have to feedback only their positions/locations/coordinates accurately, in which the base station, gigabit-node base station or evolved-node base station will process/manage their beams based on their locations reported utilizing this ultra-slow varying second order statistics of the channel stored in a map for these position. Processing their beams here means Interference alignment and/or single/multiuser beamforming.

Multi-stage beamforming and Interference alignment based on covariance matrices zonal map: the g/eNBs will perform a multistage (e.g., 2) of precoding processing, where the first stage is based on the covariance matrix. Hence, a Joint-Spatial-Division-Multiplexing (JSDM) algorithm can be used to cancel the interference (a.k.a. Interference alignment) projected onto the fed back user(s) location based on their stored covariance (2nd order statistic) matrices in the map in (p. Claim 2). Also, other algorithms can be used utilizing the covariance matrices map in (p. Claim 2); see FIG. 3 for more details.

Multi-Stage Beamforming and Interference Alignment Based on Covariance Matrices Zonal Map In embodiments, the base station, gigabit-node base station or evolved-node base station can be configured to select, responsive to a reported position of a mobile terminal, one channel covariance matrix out of a plurality of channel covariance matrices, and to select an antenna beam for communicating with the mobile terminal using the selected channel covariance matrix (first stage).

For example, referring to FIG. 5, the first base station $101_1$ can be configured to select responsive to the reported position of the first mobile terminal $103_1$ the channel covariance matrix 24 which is associated with location 24 in which the first mobile terminal $103_1$ is located, and to select an antenna beam for communicating with the first mobile terminal $103_1$ using the selected channel covariance matrix associated with location 24.

Further, the base station, gigabit-node base station or evolved-node base station can be configured to select, responsive to a reported position of a further mobile terminal located in a different location of the cell than the mobile terminal, one further channel covariance matrix out of the plurality of channel covariance matrices, wherein the base station, gigabit-node base station or evolved-node base station can be configured to select an antenna beam for communicating with the mobile terminal using the selected channel covariance matrix and the selected further channel covariance matrix (second stage).

For example, referring to FIG. 5, the first base station $101_1$ can be further configured to adapt the antenna beam used for communicating with the first mobile terminal $103_1$ using the channel covariance matrices associated with the locations in which other mobile terminals, which previously reported their positions, are located. In detail, the first base station $101_1$ can be configured to adjust the antenna beam used for communicating with the first mobile terminal $103_1$ using the channel covariance matrix associated with location 12 of the second sector $106_2$ in which a second mobile terminal $103_2$ is located, such that an interference caused by the communication on location 12 of the second sector $106_2$ and thus on the second mobile terminal $103_2$ can be reduced or even eliminated.

In embodiments, the base station, gigabit-node base station or evolved-node base station can perform a multistage (e.g., two) of precoding processing, where the first stage is based on the covariance matrix. Hence, a Joint-Spatial-Division-Multiplexing (JSDM) algorithm can be used to cancel the interference (a.k.a. Interference alignment (IA)) projected onto the fed back user(s) location based on their stored covariance (2nd order statistic) matrices in the map. Also, other algorithms can be used utilizing the covariance matrices map; see FIG. 5 for more details.

Conjugated Zone Offline Identifying

In embodiments, the base station, gigabit-node base station or evolved-node base station can be configured to use the same or at least partially overlapping downlink resources for communicating with the mobile terminal and the further mobile terminal when the selected channel covariance matrix and the selected further channel covariance matrix are orthogonal or a database in which the plurality of covariance matrices and the associated plurality of different locations of the cell are stored indicates that the same or at least partially overlapping downlink resources can be used.

For example, referring to FIG. 5, the first base station $110_1$ can be configured to communicate with the first mobile terminal $103_1$ and the third mobile terminal $103_3$ using the same or at least partially overlapping downlink resources, if the channel covariance matrices of locations 24 and 6 in which the first and third mobile terminals $103_1$ and $103_3$ are located are orthogonal to each other, since due to the orthogonality of the channel covariance matrices of locations 24 and 6 the respective communications (or antenna beams) do not interfere.

In embodiments, conjugated zones are those zone with nicely separable covariance matrix, or in other words, those zones with almost orthogonal covariance matrices (orthogonal here means, for example, that you can find a direction within matrix one which can be easily orthogonal to the eigenvectors in matrix two). Hence, down link resources can be freely reused in the same cell or within the neighboring cells. These freely reused resources can be guaranteed as an extension to the side links resource pool (together with the legacy UL resources). In other words, the base station will identify perfectly separated base station-side covariance matrices as conjugated zones (freely using similar resources).

Map Fine Tuning for Ultra-Reliable Low-Latency Communications (URLLC)

In embodiments, the base station, gigabit-node base station or evolved-node base station can be configured to monitor a downlink acknowledge or not-acknowledge rate in order to determine whether the same or the at least partially overlapping downlink resources can be used for communicating with mobile terminals located in the different locations associated with the channel covariance matrix and the further channel covariance matrix and to update the indication in the database accordingly.

For example, referring to FIG. 5, and assuming that the first base station $110_1$ communicates with the first mobile terminal $103_1$ and the third mobile terminal $103_3$ using the same or at least partially overlapping downlink resources, the first base station $101_1$ can be configured to monitor the downlink acknowledge or not-acknowledge rate of the communications with first and third mobile terminals $103_1$ and $103_3$, in order to determine whether the same or the at least partially overlapping downlink resources still or actually can be used for communicating with first and third mobile terminals $103_1$ and $103_3$ located in locations 24 and 6 of the first sector $106_1$.

In embodiments, the base station, gigabit-node base station or evolved-node base station can be configured to monitor downlink interference indicators or measurements (e.g., reference signal received power (RSRP), received signal strength indicator (RSSI), reference signal receive quality (RSRQ)) provided by the mobile terminals in order to determine whether the same or the at least partially overlapping downlink resources can be used for communicating with mobile terminals located in the different locations associated with the channel covariance matrix and the further channel covariance matrix and to update the indication in the database accordingly.

For example, referring to FIG. 5, and assuming that the first base station $110_1$ communicates with the first mobile terminal $103_1$ and the third mobile terminal $103_3$ using the same or at least partially overlapping downlink resources, the first base station $101_1$ can be configured to monitor the downlink interference indicators or measurement provided by first and third mobile terminals $103_1$ and $103_3$, in order to determine whether the same or the at least partially overlapping downlink resources still or actually can be used for communicating with first and third mobile terminals $103_1$ and $103_3$ located in locations 24 and 6 of the first sector $106_1$.

In embodiments, the base station, gigabit-node base station or evolved-node base station may identify close by "zones" by monitoring the DL ACK/NACK rate. Hence, the more ACKs, the more chance the base station, gigabit-node base station or evolved-node base station can reuse those collected resources to a certain zone (or conjugated zones) specifically for ultra-reliable and low latency communication (URLLC).

In embodiments, the base station, gigabit-node base station or evolved-node base station may identify close by "zones" monitoring the downlink interference indicators/measurements reported by the users, e.g., similar to the high Interference Indicator (HII) in LTE or similar indicators in different wireless approaches.

DL Signaling and D2D/V2X/V2V Resource Pool Extension

In embodiments, the base station, gigabit-node base station or evolved-node base station can be configured to signal those locations of the plurality of locations the cell is divided into which are free from interference from communications of the base station, gigabit-node base station or evolved-node base station.

If free zones can be generated with the localization based interference alignment described above, the signaling of the down link, i.e., from base station, gigabit-node base station or evolved-node base station to user equipment may indicate a free zone for down link data resource reuse: Being in Interference free area (corresponds to an anchor and radius) and being allowed to reuse the down link frequency without extra interference alignment/interference management allowing D2D/V2X/V2V resource reusing, i.e., extend the side links (D2D/V2X/V2V) resource pool.

For example, referring to FIG. 5, the first base station $110_1$ can be configured to signal that locations 6 and 14 are free from interference from communications of the base station, gigabit-node base station or evolved-node base station, such that a mobile terminal that is located in one of locations 6 and 14, e.g., the third mobile terminal $103_3$ can use downlink resources for communicating with another mobile terminal, e.g. the fourth mobile terminal $103_4$ which is also located in one of locations 6 and 14.

In embodiments, the base station, gigabit-node base station or evolved-node base station can be configured to select an antenna beam or antenna beams for the signaling the interference free locations using channel covariance matrices associated with the interference free locations.

If free zones can be generated with the localization based interference alignment described above, the signaling of the down link, i.e., from base station, gigabit-node base station or evolved-node base station to user equipment may indicate dedicated resources for free-zone signaling: The signaling will be provided in downlink together with the multi-stage beam forming (carried on the base station, gigabit-node base station or evolved-node base station) such that it cannot be heard in other "conjugated zone" spatially un-correlated.

For example, referring to FIG. 5, the first base station $110_1$ can be configured to select an antenna beam using the covariance matrix associated with location 6 for signaling that location 6 is interference free, and to select an antenna beam using the covariance matrix associated with location 14 for signaling that location 14 is interference free.

In embodiments, the base station, gigabit-node base station or evolved-node base station can be configured to further signal those locations of the interference free locations whose associated channel covariance matrices are orthogonal to each other. Further or alternatively, the interference free locations whose associated channel covariance matrices are orthogonal to each other are indicated in a database in which the plurality of covariance matrices and the associated plurality of different locations of the cell are stored.

Thereby, the mobile terminal and the further mobile terminal can use the same downlink resources for communicating with other mobile terminals, if the mobile terminal and the further mobile terminal are located in locations whose associated channel covariance matrices are orthogonal to each other signaled by the transceiver.

Exceptionally, UEs can use the same Downlink bands or channels granted in "conjugated zones" for D2D/V2X/V2V side link communication. This involves new signaling of the D2D resource pool onto the already used downlink resources beside the legacy uplink resource pools. This will form a resource pool extension. Hence, a full duplex side link can be easily now achieved without repetitions or frequency hopping.

Further, UEs can use the same Downlink bands or channels granted in "conjugated zones" for D2D/V2X/V2V side link communication. The zone maps known at base station, gigabit-node base station or evolved-node base station or distributed via the base station, gigabit-node base station or evolved-node base station could contain information about such additional downlink resources available at certain locations as a resource pool extension, i.e., in a semi-persistence scheduling manner, or based on demand. Such a pool can be marked by an indicator in a signaling field).

For example, referring to FIG. 5, assuming that the first base station $110_1$ signals or the data base indicates that locations 6 and 14 of the first sector $106_1$ have associated channel covariance matrices that are orthogonal to each other, the third mobile terminal $103_3$ that is located in location 6 and the fourth mobile terminal $103_4$ that is located in location 14 can use the same downlink resources for communicating with other mobile terminals located in the same locations, i.e. the third mobile terminal $103_3$ can communicate with another mobile terminal which is also located in location 6 using the same downlink resources than the fourth mobile fourth mobile terminal $103_4$, which communicates with another mobile terminal which is also located in location 14.

In embodiments, the base station, gigabit-node base station or evolved-node base station can be configured to signal those locations of the plurality of locations whose channel covariance matrices are close. In that case, the mobile terminal can be configured to use the same downlink resources when moving from one location to another location, if the covariance matrices of said locations are close. In embodiments, close covariance matrices (or similar covariance matrices) may refer to that, mobile terminals (e.g., UEs) in close-by locations are facing (almost) the same scatterers, physical infrastructure, i.e., buildings, trees, etc.

In other words, for close by zones (zone with close covariance matrices), the downlink resource pool can become a joint one allowing fewer resource handover when moving on among the zones on the ground. This improves reliability and reduce radio link failure (RLF) rate.

Extension to UE-Specific Receive Characteristics for DL and UL Scheme

In the previous described solutions it is assumed that UEs experience the same covariance matrix at the same location. However, this doesn't include the orientation of UE antennas, multiple antennas, or impacts from different hardware, e.g. a higher receiver sensitivity can detect more multi-paths and thus the covariance matrix changes.

Therefore, the map can be extended to a multi-layer map based on side-information from the UE about receiver specific details.

In embodiments, the base station, gigabit-node base station or evolved-node base station can be configured to select, responsive to a reported receiver characteristic of the mobile terminal, one out of at least two channel covariance matrices associated with each of the plurality of locations for communicating with the mobile terminal, wherein each of the at least two channel covariance matrices can be associated with a different one of at least two receiver characteristics.

In embodiments, the base station, gigabit-node base station or evolved-node base station can be configured to signal to the mobile terminal at least one out of resources and an antenna beam to be used for communicating with the transceiver or another transceiver in dependence on the selected channel covariance matrix.

Subsequently, state of the art in uplink is described making reference to TR36.211v14.1.0 Section 5.3.2A.2 (definition of codebooks for UL transmission).

In embodiments, the UE can use different precoding vectors/matrices defined as W to communicate with gigabit-node base station:

$$Y_{UL} = P_{post} H_{BS \times UE} W_{UE}^H x_{UL} + P_{post} n_{UL}$$

$$Y_{DL} = W_{UE} H_{UE \times BS} P_{UE} x_{DL} + W_{UE} n_{DL}$$

The capturing of the map in this case can be done on two phases, wherein phase 1 can be a training phase and phase 2 can be a data processing/transmission phase.

In phase 1 (training phase for map generation), the gigabit-node may need to know from UE
  in conjunction with the UE feedback to the base station, i.e., the channel quality indicator (CQI), the channel rank indicator (RI) and the channel precoding matrix index (PMI), the UE may be needed to feedback information about the amount of antennas it has and its physical antenna structure (e.g., antenna gain, orientation, geometry).
  Additionally (optionally), one more step could be an on-demand (extra) training phase, where the channel state information (CSI) is fed back, which is composed of <CQI, PMI, and RI>; an extra quantized received beamforming index (qRBFi), either one set or multiple of those sets can be reported using different (sorted) PMIs for the base station, gigabit-node base station or evolved-node base station and/or different (sorted) qRBFi values. It can be also selected based on the transmit beamforming.
  The qRBFi ($W_{BS}$) can be used for post-process (RX-beamforming) the receiving the signal at UE during downlink, i.e., to receive in the direction of maximum received directions, i.e., directions of receiving at the UE, the direction spans $W_{UE}$
  The qRBFi ($W_{UE}$) can be selected from the uplink precoding matrices (i.e., from UL transmission, 36.211—section 5; however, now only limited to 2 and 4 ports). However, this is not limited to larger DFT sets, random BF, etc. . . . . .
  Tweaking option to return back to the single layer mapping: the UE can use its dominant receive eigenmode as qRBF and therefore tell the gNB it's a single-antenna receiver with a certain gain.
Phase 2 (Data Transmission)
  base station, gigabit-node base station or evolved-node base station signals the UE the post-equalizer/and the precoding, which should be used to satisfy certain transmission quality and possible interference alignment; i.e., could be exactly the same transmission otherwise.
  UE can be allowed to adopt optimized MMSE weights to handle channel variations.
  During uplink reception, the base station, gigabit-node base station or evolved-node base station selects a $P_{post}$ that fits the maximum reception knowing $W_{UE}^H$ (qRBFi).

Figure 8A:
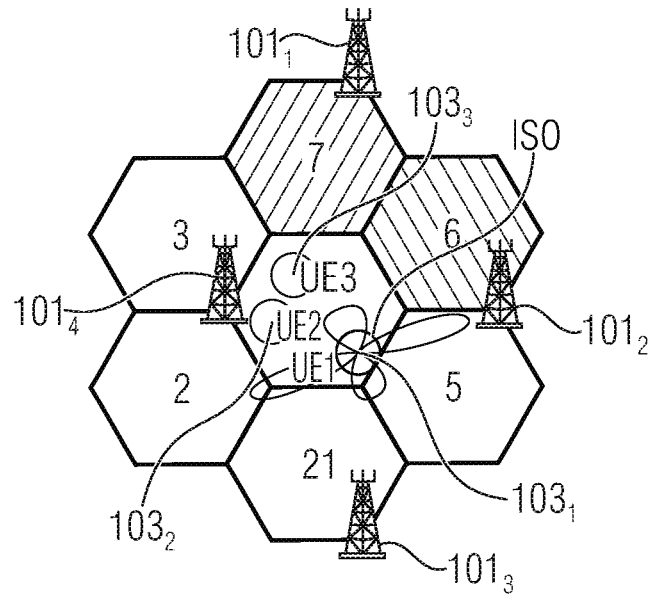
FIG. 8a shows a schematic block diagram of a wireless communication network with base stations and user equipment with beamforming and omni-directional antennas.
Figure 8B:
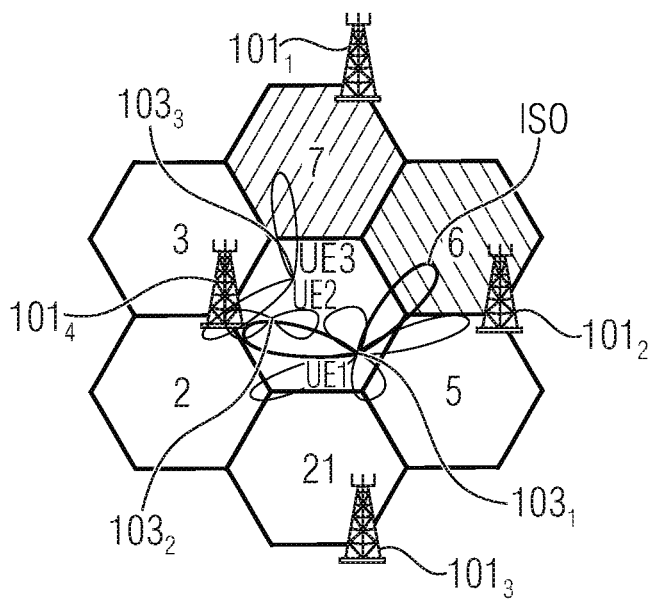
FIG. 8b shows a schematic block diagram of a wireless communication network with base stations and user equipment with beamforming antennas.

FIGS. 8a and 8b show a schematic block diagram of a wireless communication network 100 with base stations $101_1$ to $101_4$ and user equipment $103_1$ to $103_3$. As shown in FIG. 8a, the first user equipment $103_1$ comprises multiple antennas for receive beamforming, wherein the second user equipment $103_2$ and third user equipment $103_3$ comprise omnidirectional antennas, such that the interference 150 is received everywhere in omni-direction antenna. In contrast, in FIG. 8b, first to third user equipment $103_1$ to $103_3$ comprise multiple antennas for receive beamforming, such that with RX-beamforming, the interference 150 can be gathered at the nulls.

Figure 9A:
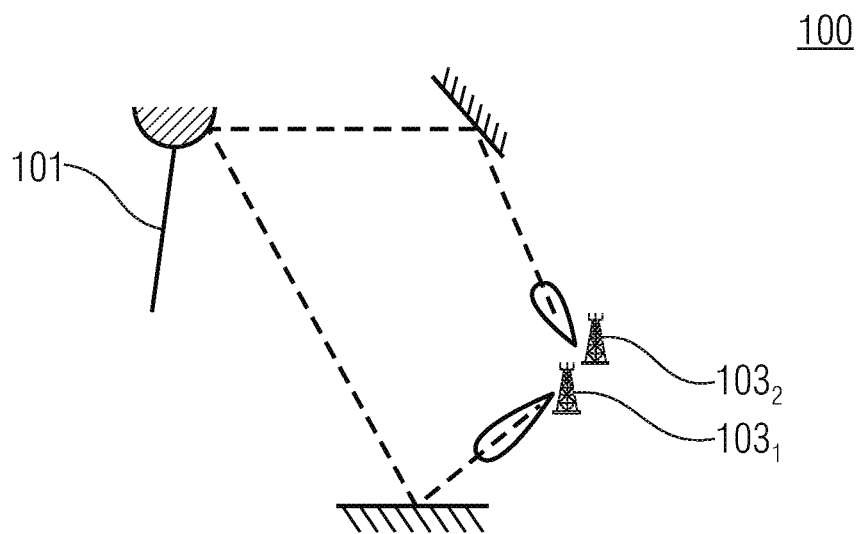
FIG. 9a shows a schematic block diagram of a wireless communication network with a base station and a first user equipment and a second user equipment with beamforming antennas.
Figure 9B:
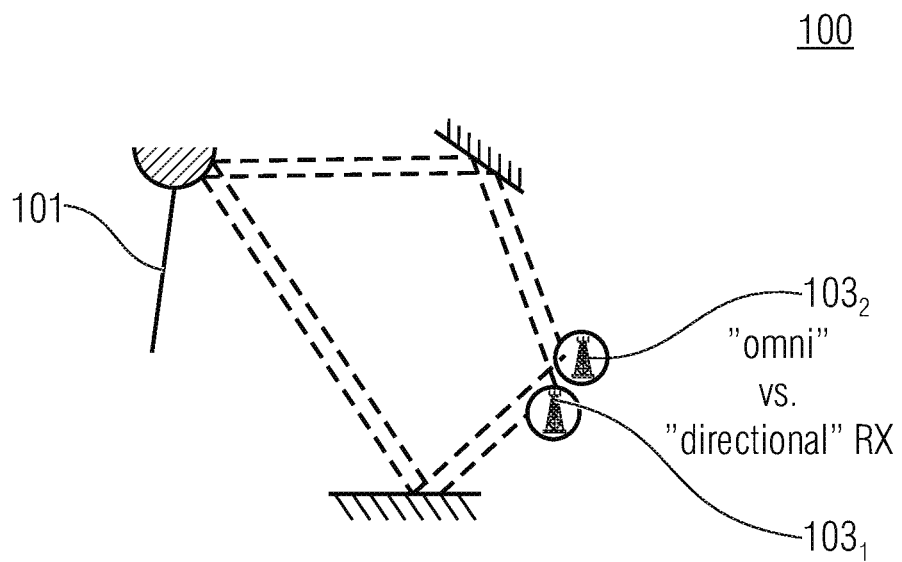
FIG. 9b shows a schematic block diagram of a wireless communication network with a base station and a first user equipment and a second user equipment with omni directional antennas.

FIGS. 9a and 9b show a schematic block diagram of a wireless communication network 100 with a base station 101 and a first user equipment $103_1$ and a second user equipment $103_3$. In FIG. 9a, the first user equipment $103_1$ and the second user equipment $103_3$ comprise multiple antennas for receive beamforming, wherein in FIG. 9b, the first user equipment $103_1$ and the second user equipment $103_3$ comprise omnidirectional antennas. As shown in FIGS. 9a and 9b, the receive beamforming (FIG. 9a) can avoid the interference from the other receiver compared to the omnidirection case (FIG. 9b) that collects from everywhere.

In embodiments, the zonal concept can be extended by capturing the UE RX characteristics (radiation pattern and orientation).

In embodiments, the zonal concept can be extended by classifying the device class.

In embodiments, the zonal concept can be extended by embodiments dealing with carrier aggregation, i.e., different maps for different frequencies.

Figure 10:
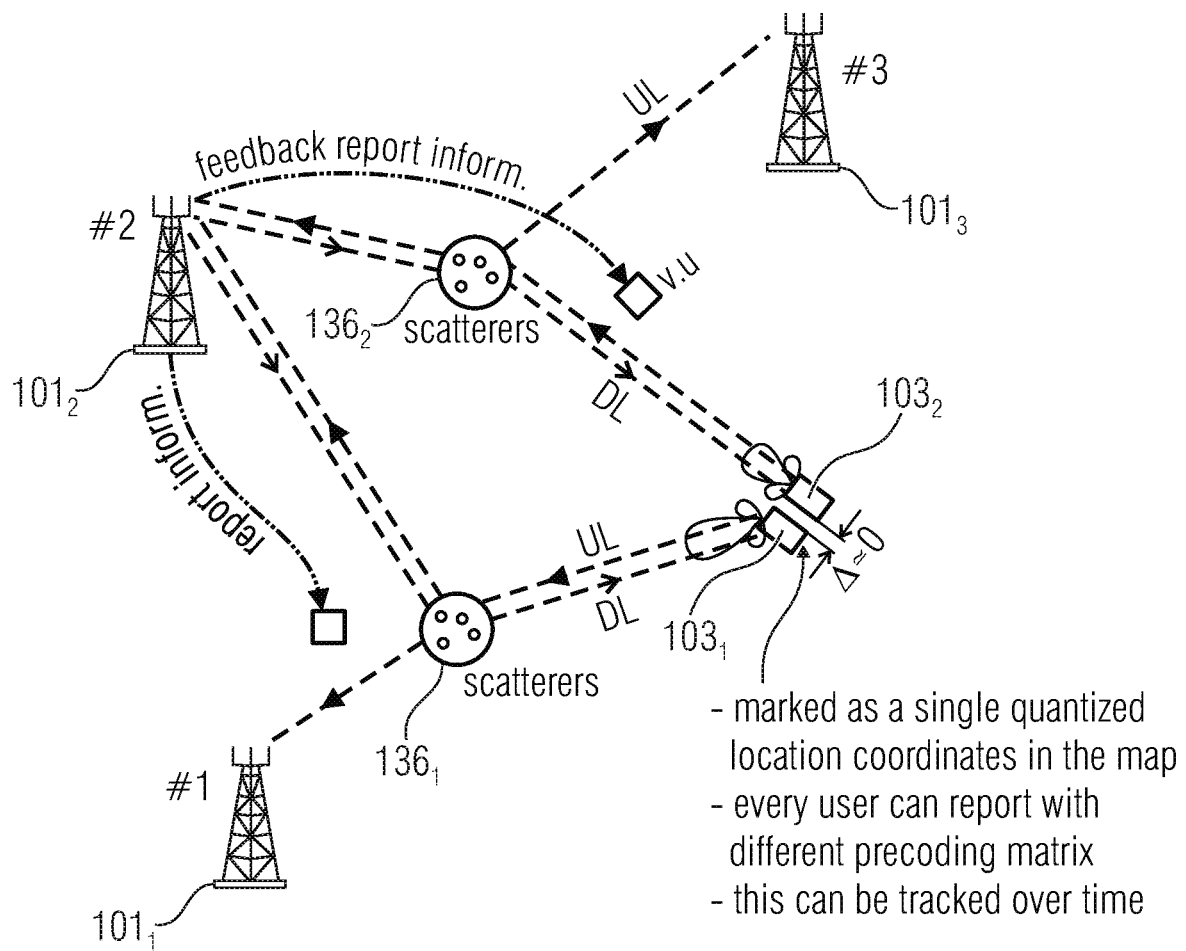
FIG. 10 shows a schematic block diagram of a wireless communication network comprising three transceivers and two mobile terminals with directional antennas, according to an embodiment.

FIG. 10 shows a schematic block diagram of a wireless communication network 100 comprising three transceivers $101_1, 101_2$ and $101_3$ and two mobile terminals $103_1$ and $103_2$ with directional antennas, according to an embodiment. Further, in FIG. 10 scatterers $136_1$ and $136_2$ are indicated scattering uplink and downlink communications between the mobile terminal $103_1$ and the respective transceivers $101_1, 101_2$ and $101_3$. In detail, a first mobile terminal $103_1$ is communicating with a second transceiver $101_2$, wherein a first scatterer $136_1$ scatters uplink and downlink communications between the first mobile terminal $103_1$ and the second transceiver $101_2$, such that also the first transceiver $101_1$ receives uplink communications from the first mobile terminal $103_1$. A second mobile terminal $103_2$ is communicating with the second transceiver $101_2$, wherein a second scatterer $136_2$ scatters uplink and downlink communications between the second mobile terminal $103_2$ and the second transceiver $101_2$, such that also the third transceiver $101_3$ receives uplink communications from the second mobile terminal $103_2$.

In other words, FIG. 10 shows that even if the two UEs are marked as located to the quantized coordinates location, every user can isolate his uplink and downlink as they have reported their different precoding matrix or receiver structure (covariance matrix, numb-antennas at the UE, . . . ). This can also be updated frequently.

Further Embodiments

Figure 11:
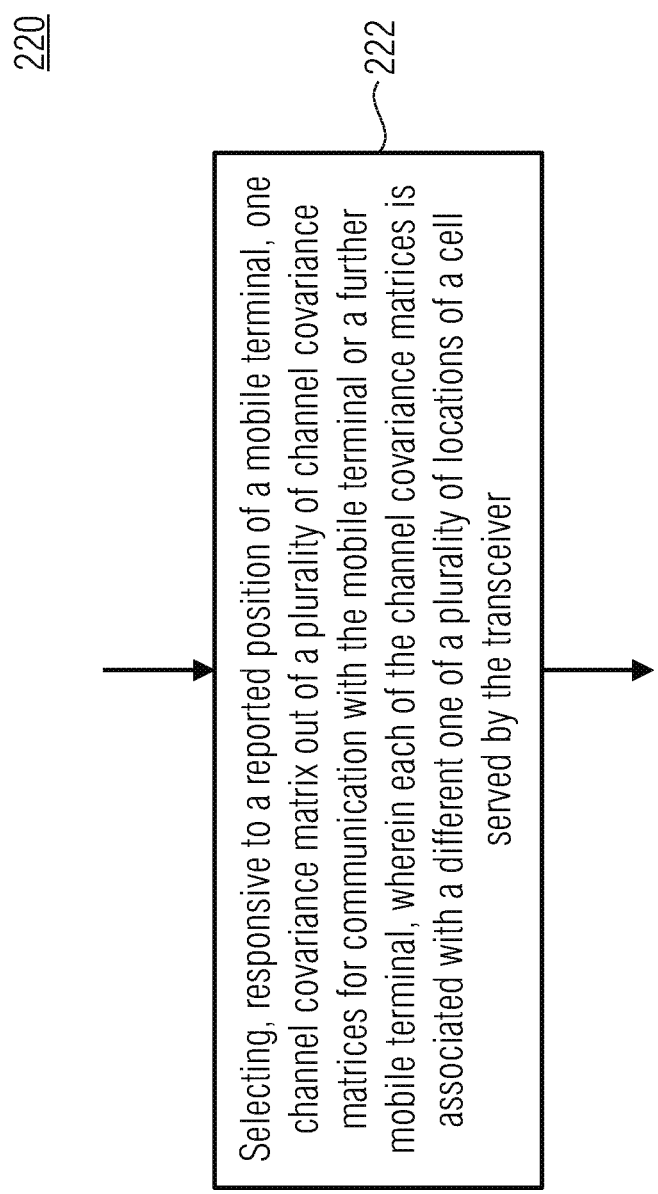
FIG. 11 shows a flowchart of a method for operating a transceiver, according to an embodiment.

FIG. 11 shows a flowchart of a method 220 for operating a transceiver. The method 220 comprises a step 222 of selecting, responsive to a reported position of a mobile terminal, one channel covariance matrix out of a plurality of channel covariance matrices for communication with the mobile terminal or a further mobile terminal, wherein each of the channel covariance matrices is associated with a different one of a plurality of locations of a cell served by the transceiver In embodiments, it assumed that UEs are capable for sending, somehow, reliable positioning information.

In embodiments, it assumed that a multistage beamforming is possible at the multi-antenna base station, evolved-node base station or gigabit-node base station with enabled beamforming capabilities.

In embodiments, it assumed that the base station, evolved-node base station or gigabit-node base station can slowly monitor and adapt the covariance matrices map.

In embodiments, it assumed that the cells might be capable of capturing the UE density (on a long-term basis) to generate such a map with some time invariances. Hence, the map can be used to handle any number of users in a time static fashion or varying with the different varying traffic load if needed.

In embodiments, resources among neighboring cells can be reused only based on geo-spatial mapping.

In embodiments, the side link resource pool in down link can be extended.

Embodiments described can be implemented in or used for V2X, V2V, D2D, cellular system, latency-constrained (mission-critical) communication services, multilevel QoS services, narrow-band IoT devices, mMTC, ultra-reliable communication, enhanced multiple access (MA) scheme and MAC channels.

Figure 12:
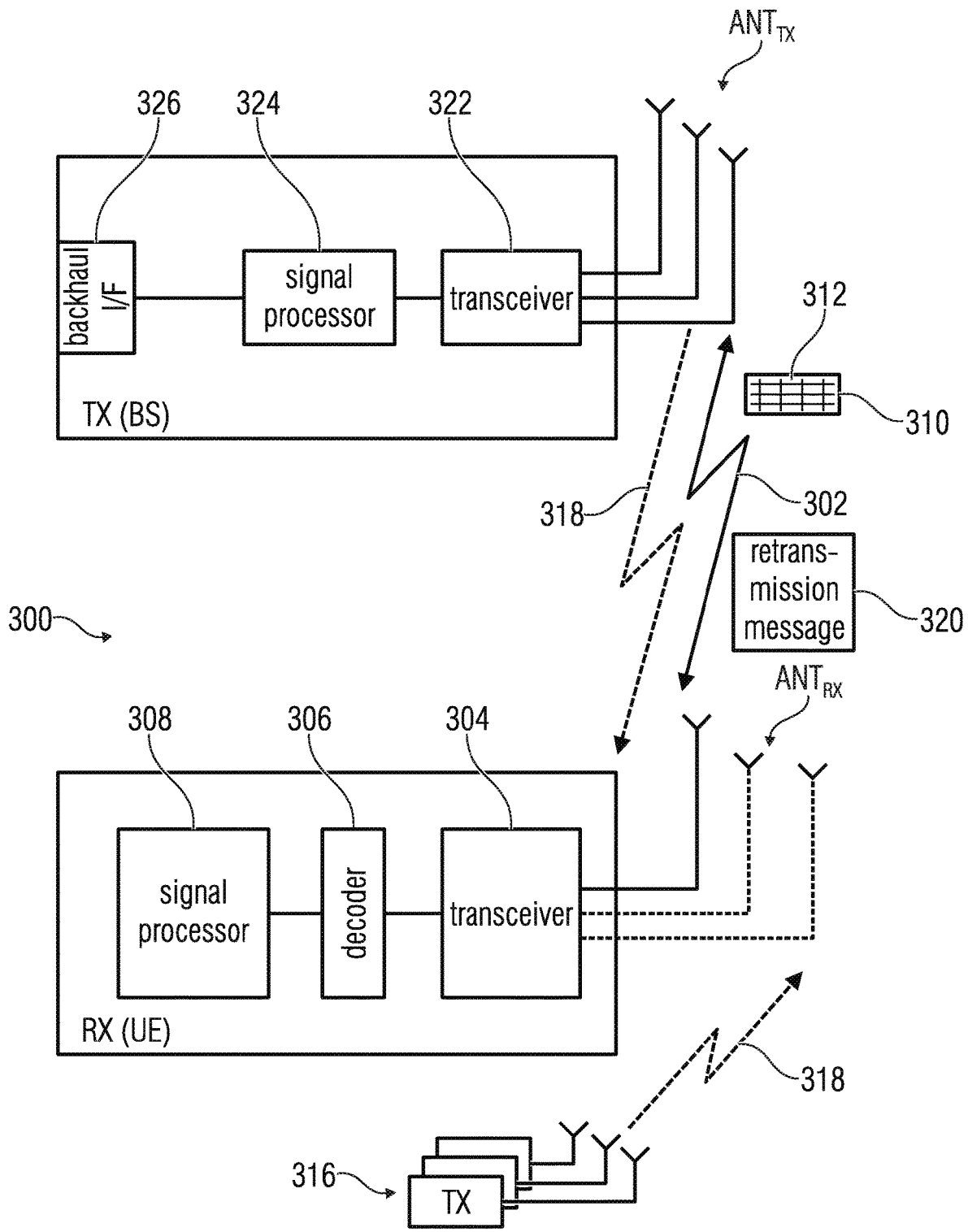
FIG. 12 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 12 is a schematic representation of a wireless communication system 300 for communicating information between a transmitter TX and a receiver RX and operating in accordance with embodiments of the inventive approach described above. The transmitter TX, e.g., the bases station, includes one or more antennas ANTTX or an antenna array having a plurality of antenna elements. The receiver RX, e.g., the UE, includes at least one antenna ANTRX. In other embodiments, the receiver RX may include more than one antenna. As is indicated by the arrow 302 signals are communicated between the transmitter TX and the receiver RX via a wireless communication link, like a radio link. The operation of the transmitter TX and the receiver RX and the signaling between the transmitter TX and the receiver RX is in accordance with the above described embodiments of the present invention.

For example, the receiver RX includes the one or more antennas ANTRX, a transceiver 304 coupled to the antenna, a decoder 306 and a processor 308. The transceiver 304 receives from the transmitter TX of the wireless communication network 300 a data block 310. The data block 310 includes encoded data transmitted on a plurality of resources 312 allocated to the receiver RX. The decoder 310 decodes the encoded data and determines for the allocated resources 312 whether decoding of the encoded data was successful or failed. The processor 308 evaluates whether one or more of the resources 312 for which the decoding failed are included in a report 314. The report 314 indicates for the one or more allocated resources 312 that encoded data transmitted on the one or more of the allocated resources is not decodable, e.g., due to impairments, like puncturing, interference or a reduction of a signal strength, the resources may experiences from the transmitter TX and/or from one or more further transmitters 316 of the wireless communication network 300 as is schematically represented at 318. The processor 308 causes the transceiver 304 to send a retransmission request 320 to the transmitter TX responsive to the evaluation.

In accordance with embodiments, the transmitter TX includes the one or more antennas ANTTX and a transceiver 322 coupled to the antenna ANTTX. The transceiver 322 communicates with one or more receivers RX of the wireless communication network 300. The one or more receivers RX are served by the transmitter TX. The transceiver 322 transmits to the one or more receivers RX the report 310. The report 310 indicates for one or more resources 312, which are allocated to the one or more receivers RX, that encoded data transmitted on the one or more of the allocated resources is not decodable. In accordance with embodiments, the transmitter TX may include a processor 324 which generates the report 310 based on information from the transmitter TX and/or from the one or more further transmitters 318. The information may indicate that data transmitted on certain resources is probably not decodable at the receiver. In embodiments in which also the information from the one or more further transmitters 318 is used for creating the report, the transmitter TX may include a backhaul interface 326 to the one or more further transmitters 318 of the wireless communication network 300.

Although the above described embodiments are based on channel covariance matrices, also other communication matrices could be used, such as second-order statistics matrices or dominant direction slowly varying channel matrices.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 13:
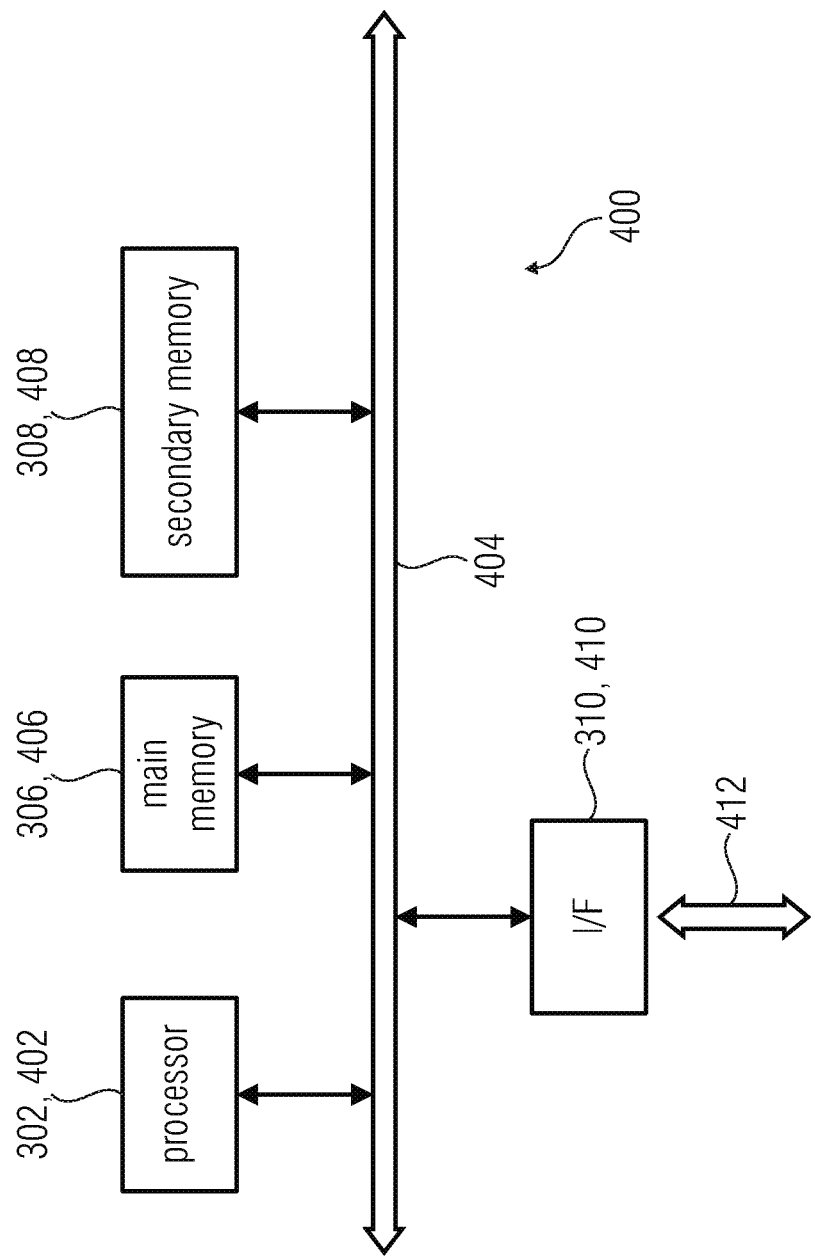
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the form electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enable the computer system 400 to implement the present invention. In particular, the computer program, when executed, enable processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including

LIST OF ACRONYMS AND SYMBOLS

| | |
|---|---|
| eNB | Evolved Node B (3G base station) |
| LTE | Long-Term Evolution |
| UE | User Equipment (User Terminal) |
| ACLR | Adjacent channel leakage ratio |
| TDD | Time Division Duplex |
| FDD | Frequency Division Duplex |
| OFDMA | Orthogonal Frequency-Division Multiple Access |
| CQI | Channel Quality Information |
| CRC | Cyclic Redundancy Check |
| SPS | Semi-persistent Scheduling |
| DCI | Downlink Control Information |
| UL | Uplink |
| DL | Downlink |
| (s)TTI | (short) Transmission Time Interval |
| PUSCH | Physical Uplink Shared Channel |
| PUCCH | Physical Uplink Control Channel |
| PDSCH | Physical Downlink Shared Channel |
| PDCCH | Physical Downlink Control Channel |
| URLLC | Ultra-reliable Low-latency Communications |
| SR | scheduling request |
| HARQ | hybrid automatic repeat request |
| QoS | hybrid automatic repeat request |
| URLLC | ultra-reliable and low latency communications |
| MCS | Modulation coding scheme |
| MIMO | Multiple Input, Multiple output |

The invention claimed is:

1. A transceiver, wherein
the transceiver is configured to select, responsive to a reported position of a mobile terminal, one communication matrix out of a plurality of communication matrices for communication with the mobile terminal;
wherein each of the communication matrices is associated with a different one of a plurality of locations of a cell served by the transceiver;
wherein the plurality of communication matrices are channel covariance matrices or second-order statistics matrices or dominant direction slowly varying channel matrices;
wherein the transceiver is configured to select, responsive to a reported position of a further mobile terminal located in a different location of the cell than the mobile terminal, one further communication matrix out of the plurality of communication matrices;
wherein the transceiver is configured to select an antenna beam for communicating with the mobile terminal using the selected communication matrix and the selected further communication matrix.

2. The transceiver according to claim 1, wherein the transceiver is configured to communicate with the mobile terminal using the selected communication matrix.

3. The transceiver according to claim 1, wherein the transceiver is configured select an antenna beam for communicating with the mobile terminal using the selected communication matrix.

4. The transceiver according to claim 1, wherein the transceiver is configured to select, responsive to a reported position of the further mobile terminal located in a different location of the cell than the mobile terminal, one further communication matrix out of the plurality of communication matrices;
wherein the transceiver is configured to select an antenna beam for communicating with the further mobile terminal using the selected further communication matrix.

5. The transceiver according to claim 4, wherein the transceiver is configured to use the same or at least partially overlapping downlink resources for communicating with the mobile terminal and the further mobile terminal when the selected communication matrix and the selected further communication matrix are orthogonal or a database in which the plurality of communication matrices and the associated plurality of different locations of the cell are stored indicates that the same or at least partially overlapping downlink resources can be used.

6. The transceiver according to claim 5, wherein the transceiver is configured to monitor a downlink acknowledge or not-acknowledge rate in order to determine whether the same or the at least partially overlapping downlink resources can be used for communicating with mobile terminals located in the different locations associated with the communication matrix and the further communication matrix and to update the indication in the database accordingly.

7. The transceiver according to claim 5, wherein the transceiver is configured to monitor downlink interference indicators or measurement provided by the mobile terminals in order to determine whether the same or the at least partially overlapping downlink resources can be used for communicating with mobile terminals located in the different locations associated with the communication matrix and the further communication matrix and to update the indication in the database accordingly.

8. The transceiver according to claim 1, wherein the transceiver is configured to signal those locations of the plurality of locations the cell is divided into which are free from interference from communications of the transceiver.

9. The transceiver according to claim 1, wherein the transceiver is configured to select an antenna beam or antenna beams for the signaling the interference free locations using communication matrices associated with the interference free locations.

10. The transceiver according to claim 8, wherein the transceiver is configured to further signal those locations of the interference free locations whose associated communication matrices are orthogonal to each other.

11. The transceiver according to claim 8, wherein the interference free locations whose associated communication matrices are orthogonal to each other are indicated in a database in which the plurality of communication matrices and the associated plurality of different locations of the cell are stored.

12. The transceiver according to claim 8, wherein transceiver is configured to signal those locations of the plurality of locations whose communication matrices are close.

13. The transceiver according to claim 1, the transceiver is configured to select, responsive to a reported receiver characteristic of the mobile terminal, one out of at least two communication matrices associated with each of the plurality of locations for communicating with the mobile terminal;
wherein each of the at least two communication matrices is associated with a different one of at least two receiver characteristics.

14. The transceiver according to claim 1, wherein the transceiver is configured to signal to the mobile terminal at least one out of resources and an antenna beam to be used for communicating with the transceiver or another transceiver in dependence on the selected communication matrix.

15. The transceiver according to claim 1, wherein the transceiver is configured to update a communication matrix of the plurality of communication matrices, if an average of a plurality of measured communication matrices measured by the mobile terminal or another mobile terminal at the location corresponding to said communication matrix deviates by a defined amount from said communication matrix.

16. The transceiver according to claim 1, wherein the channel covariance matrices are long-term second order channel state information.

17. The transceiver according to claim 1, wherein the transceiver is a base station, evolved-node base station or gigabit node base station.

18. A wireless communication network, comprising:
   a transceiver, wherein
      the transceiver is configured to select, responsive to a reported position of a mobile terminal, one communication matrix out of a plurality of communication matrices for communication with the mobile terminal;
      wherein each of the communication matrices is associated with a different one of a plurality of locations of a cell served by the transceiver;
      wherein the plurality of communication matrices are channel covariance matrices or second-order statistics matrices or dominant direction slowly varying channel matrices;
      wherein the transceiver is configured to select, responsive to a reported position of a further mobile terminal located in a different location of the cell than the mobile terminal, one further communication matrix out of the plurality of communication matrices;
      wherein the transceiver is configured to select an antenna beam for communicating with the mobile terminal using the selected communication matrix and the selected further communication matrix; and
   a mobile terminal.

19. The wireless communication network according to claim 18, wherein the wireless communication network comprises a cellular network, a wireless local area network or a wireless sensor system.

20. The wireless communication network according to claim 18, wherein the mobile terminal is a user equipment, a vehicle transceiver device, a moving (slowly/fast) handheld, a fixed handheld, an IoT device, a moving relay, or fixed device.

21. The wireless communication network according to claim 18 and the transceiver, wherein the transceiver is configured to signal those locations of the plurality of locations the cell is divided into which are free from interference from communications of the transceiver, wherein the mobile terminal is configured to use downlink resources for communicating with another mobile terminal, if the mobile terminal is located in an interference free location signaled by the transceiver.

22. The wireless communication network according to claim 21 and the transceiver, wherein the transceiver is configured to further signal those locations of the interference free locations whose associated communication matrices are orthogonal to each other, wherein the transceiver is configured to signal those locations of the plurality of locations the cell is divided into which are free from interference from communications of the transceiver, wherein the wireless communication network comprises a further mobile terminal, wherein the mobile terminal and the further mobile terminal are configured to use the same downlink resources for communicating with other mobile terminals, if the mobile terminal and the further mobile terminal are located in locations whose associated communication matrices are orthogonal to each other signaled by the transceiver.

23. The wireless communication network according to claim 20 and the transceiver, wherein the transceiver is configured to signal those locations of the plurality of locations whose communication matrices are close, wherein the transceiver is configured to signal those locations of the plurality of locations the cell is divided into which are free from interference from communications of the transceiver, wherein the mobile terminal is configured to use the same downlink resources when moving from one location to another location, if the communication matrices of said locations are close.

24. The wireless communication network according to claim 18, wherein the cellular network uses an IFFT (Inverse Fast Fourier Transform) based signal.

25. The wireless communication network according to claim 24, wherein the IFFT based signal includes OFDM with CP, DFT-s-OFDM with CP, IFFT-based waveforms without CP, f-OFDM, FBMC, GFDM or UFMC.

26. A method for operating a transceiver, the method comprising:
   selecting, responsive to a reported position of a mobile terminal, one communication matrix out of a plurality of communication matrices for communication with the mobile terminal;
   wherein each of the communication matrices is associated with a different one of a plurality of locations of a cell served by the transceiver;
   wherein the plurality of communication matrices are channel covariance matrices or second-order statistics matrices or dominant direction slowly varying channel matrices;
   selecting, responsive to a reported position of a further mobile terminal located in a different location of the cell than the mobile terminal, one further communication matrix out of the plurality of communication matrices; and
   selecting an antenna beam for communicating with the mobile terminal using the selected communication matrix and the selected further communication matrix.

27. A method for generating a database having stored a plurality of communication matrices associated with a plurality of different locations of a cell of a wireless communication network, wherein the plurality of communication matrices are channel covariance matrices or second-order statistics matrices or dominant direction slowly varying channel matrices, the method comprising:
   clustering measured communication matrices based on reported positions at which the communication matrices were measured, to acquire a plurality of clusters of measured communication matrices;
   determining an average communication matrix for each of the plurality of clusters of measured communication matrices; and
   associating each average communication matrix with a location of the cell of the wireless communication network is divided into based on the reported positions at which the communication matrices of the respective cluster were measured, to acquire a plurality of communication matrices associated with a plurality of different locations.

28. The method of claim 27, wherein the method further comprises:
   determining those communication matrices of the plurality of communication matrices which are orthogonal to each other; and marking those communication matrices of the plurality of communication matrices which are orthogonal to each other in the database.

29. The method of claim 27, wherein the measured communication matrices were measured with at least two different transceiver characteristics;
   wherein at least two average communication matrices are determined for the at least two different transceiver characteristics for each of the plurality of clusters of measured communication matrices;
   wherein at least two average communication matrices are associated with a location of the cell of the wireless communication network is divided into based on the reported positions at which the communication matrices of the respective cluster were measured, to acquire a plurality of at least two communication matrices associated with a plurality of different locations.

* * * * *